(12) United States Patent
Amano

(10) Patent No.: US 10,890,691 B2
(45) Date of Patent: Jan. 12, 2021

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 344 days.

(21) Appl. No.: 16/059,484

(22) Filed: Aug. 9, 2018

(65) Prior Publication Data
US 2019/0056534 A1 Feb. 21, 2019

(30) Foreign Application Priority Data

Aug. 17, 2017 (JP) ................... 2017-157549

(51) Int. Cl.
| | |
|---|---|
| *G02B 3/00* | (2006.01) |
| *G02B 13/16* | (2006.01) |
| *H04N 9/31* | (2006.01) |
| *G02B 13/04* | (2006.01) |
| *G02B 13/06* | (2006.01) |
| *G02B 13/22* | (2006.01) |
| *G09G 5/10* | (2006.01) |

(52) U.S. Cl.
CPC .............. *G02B 3/00* (2013.01); *G02B 13/04* (2013.01); *G02B 13/06* (2013.01); *G02B 13/16* (2013.01); *G02B 13/22* (2013.01); *G09G 5/10* (2013.01); *H04N 9/31* (2013.01)

(58) Field of Classification Search
CPC . G02B 3/00; G02B 3/02; G02B 13/04; G02B 13/06; G02B 13/12; G02B 13/14; G02B 13/16; G02B 13/22; G02B 13/004; G02B 15/142; G02B 15/1421; G02B 9/34; G02B 27/18; H04N 9/31; G09G 5/10

USPC ....... 359/432, 659, 658, 657, 660, 746, 747, 359/750, 751, 752, 754, 755, 756, 764, 359/767, 771, 772
See application file for complete search history.

(56) References Cited

U.S. PATENT DOCUMENTS

| | | | | |
|---|---|---|---|---|
| 2004/0032653 | A1* | 2/2004 | Gohman | G02B 13/16 359/434 |
| 2014/0036142 | A1* | 2/2014 | Inoko | G02B 13/22 348/369 |
| 2016/0246037 | A1* | 8/2016 | Amano | G02B 17/008 359/649 |

FOREIGN PATENT DOCUMENTS

| | | |
|---|---|---|
| JP | 2014-029392 A | 2/2014 |
| JP | 2016-143032 A | 8/2016 |

* cited by examiner

*Primary Examiner* — Stephone B Allen
*Assistant Examiner* — Rahman Abdur
(74) *Attorney, Agent, or Firm* — Studebaker & Brackett PC

(57) ABSTRACT

The imaging optical system consists of, in order from a magnification side, a first optical system and a second optical system. The first optical system consists of, in order from the magnification side, a first A lens group having a positive refractive power and a first B lens group having a positive refractive power with the maximum air gap interposed between the lens surfaces in the first optical system. The second optical system consists of, in order from the magnification side, a second A lens group having a positive refractive power and a second B lens group having a positive refractive power with the maximum air gap interposed between the lens surfaces in the second optical system.

18 Claims, 10 Drawing Sheets

EXAMPLE 1

EXAMPLE 1

EXAMPLE 3

EXAMPLE 2

EXAMPLE 3

IMAGING OPTICAL SYSTEM, PROJECTION DISPLAY DEVICE, AND IMAGING APPARATUS

CROSS-REFERENCE TO RELATED APPLICATIONS

The present application claims priority under 35 U.S.C. § 119 to Japanese Patent Application No. 2017-157549, filed on Aug. 17, 2017. The above application is hereby expressly incorporated by reference, in its entirety, into the present application.

BACKGROUND OF THE INVENTION

1. Field of the Invention

The present invention relates to an imaging optical system, a projection display device, and an imaging apparatus.

2. Description of the Related Art

In the past, projection display devices, each of which projects an image displayed on a light valve such as a liquid crystal display element or a Digital Micromirror Device (DMD: registered trademark) onto a screen or the like in an enlarged manner, have come into widespread use. In a projection imaging optical system used in combination with a light valve in a projection display device, it has been demanded that aberration correction appropriate for the resolution of the light valve is satisfactorily performed in response to recent improvement in performance of the light valve. Further, in consideration of using a projection display device in a relatively narrow indoor space for presentation use or the like, there is a demand for a projection imaging optical system having a wider angle.

Examples of the imaging optical system applicable to known projection display devices include optical systems described in JP2014-029392A and JP2016-143032A. JP2014-029392A and JP2016-143032A each describe an optical system in which an intermediate image is formed by a reduction side optical system consisting of a plurality of lenses and the intermediate image is re-formed by a magnification side optical system consisting of a plurality of lenses.

SUMMARY OF THE INVENTION

In addition to the above demands, there is also a demand for reducing the costs of the projection display device. Accordingly, a demand for reducing the costs of the imaging optical system mounted on the projection display device is getting stronger. However, the optical systems described in JP2014-029392A and JP2016-143032A each have a large number of lenses and the optical systems do not meet the demands for cost reduction in recent years.

The present invention has an object to provide, as an optical system configured to form an intermediate image, an imaging optical system that has high optical performance by satisfactorily correcting various aberrations while minimizing the number of lenses, a projection display device comprising the imaging optical system, and an imaging apparatus comprising the imaging optical system.

In order to achieve the object, an imaging optical system of the present invention consists of, in order from a magnification side to a reduction side: a first optical system that includes a plurality of lenses; and a second optical system that includes a plurality of lenses. The second optical system forms an intermediate image at a position conjugate to a reduction side imaging surface, and the first optical system re-forms the intermediate image on a magnification side imaging surface. The first optical system consists of, in order from the magnification side to the reduction side, a first A lens group that has a positive refractive power as a whole, and a first B lens group that has a positive refractive power as a whole and is separated from the first A lens group by a maximum air gap on an optical axis between lens surfaces in the first optical system. The second optical system consists of, in order from the magnification side to the reduction side, a second A lens group that has a positive refractive power as a whole, and a second B lens group that has a positive refractive power as a whole and is separated from the second A lens group by a maximum air gap on the optical axis between lens surfaces in the second optical system. A negative lens included in the first B lens group is only a lens which is disposed to be closest to the magnification side in the first B lens group. A negative lens included in the second A lens group is only a lens which is disposed to be closest to the magnification side in the second A lens group. In addition, a negative lens included in the second B lens group is only a lens which is disposed to be closest to the magnification side in the second B lens group.

In the imaging optical system of the present invention, assuming that a focal length of the imaging optical system is f, a focal length of the negative lens disposed to be closest to the magnification side in the first B lens group is fn1B, a focal length of the negative lens disposed to be closest to the magnification side in the second A lens group is fn2A, and a focal length of the negative lens disposed to be closest to the magnification side in the second B lens group is fn2B, it is preferable that all Conditional Expressions (1) to (3) are satisfied. In that case, it is more preferable to satisfy Conditional Expression (1-1) instead of Conditional Expression (1), it is more preferable to satisfy Conditional Expression (2-1) instead of Conditional Expression (2), and it is more preferable to satisfy Conditional Expression (3-1) instead of Conditional Expression (3).

$$-12 < fn1B/|f| < -2 \tag{1}$$

$$-12 < fn2A/|f| < -2 \tag{2}$$

$$-12 < fn2B/|f| < -2 \tag{3}$$

$$-8 < fn1B/|f| < -3 \tag{1-1}$$

$$-8 < fn2A/|f| < -3 \tag{2-1}$$

$$-8 < fn2B/|f| < -3 \tag{3-1}$$

Assuming that a focal length of the imaging optical system is f and a focal length of the first optical system is f1, it is preferable to satisfy Conditional Expression (4), and it is more preferable to satisfy Conditional Expression (4-1).

$$1 < |f1/f| < 2.5 \tag{4}$$

$$1.3 < |f1/f| < 2.2 \tag{4-1}$$

Assuming that a focal length of the first A lens group is f1A and a focal length of the first B lens group is f1B, it is preferable to satisfy Conditional Expression (5), and it is more preferable to satisfy Conditional Expression (5-1).

$$0.1 < f1B/f1A < 0.9 \tag{5}$$

$$0.2 < f1B/f1A < 0.7 \tag{5-1}$$

Assuming that a focal length of the imaging optical system is f and a back focal length at an air conversion distance of the imaging optical system in a case where the reduction side is set as a back side is Bf, it is preferable to satisfy Conditional Expression (6), and it is more preferable to satisfy Conditional Expression (6-1).

$$4 < Bf/|f| \tag{6}$$

$$7 < Bf/|f| < 15 \tag{6-1}$$

It is preferable that a positive lens is adjacent to the negative lens, which is closest to the magnification side in the first B lens group, on the reduction side of the negative lens, and the positive lens and the negative lens, which is closest to the magnification side in the first B lens group, are cemented to each other.

It is preferable that the first B lens group includes only four lenses, which consists of one negative lens and three positive lenses, as lenses having refractive powers.

It is preferable that the second A lens group includes only three lenses, which consists of one negative lens and two positive lenses, as lenses having refractive powers.

It is preferable that the second B lens group includes only four lenses, which consists of one negative lens and three positive lenses, as lenses having refractive powers.

It is preferable that first, second, and third lenses from the magnification side in the first A lens group are all negative lenses.

A projection display device of the present invention comprises: a light source; a light valve into which light emitted from the light source is incident; and the imaging optical system of the present invention. It is preferable that the imaging optical system projects an optical image using modulated light, which is modulated through the light valve, onto a screen.

An imaging apparatus of the present invention comprises the imaging optical system of the present invention.

In a case where the imaging optical system of the present invention is applied to a projection display device, the "magnification side" means a projection target side (screen side), the "reduction side" means an original image display region side (light valve side).

In the present description, it should be noted that the terms "consisting of ~" and "consists of ~" mean that the imaging lens may include not only the above-mentioned elements but also lenses substantially having no powers, optical elements, which are not lenses, such as a stop, a filter, and a cover glass, and mechanism parts such as a lens flange, a lens barrel, an imaging element, and a camera shaking correction mechanism.

The sign of the refractive power in the present specification is to be considered in terms of the paraxial region unless otherwise noted. Further, the values used in the above conditional expressions are values in a case where the distance from the magnification side imaging surface to the lens surface closest to the magnification side is set to be infinite and the d line (a wavelength of 587.6 nm (nanometers)) is set as a reference.

According to the present invention, it is possible to provide, as an optical system configured to form an intermediate image, an imaging optical system that has high optical performance by satisfactorily correcting various aberrations while minimizing the number of lenses, a projection display device comprising the imaging optical system, and an imaging apparatus comprising the imaging optical system.

DESCRIPTION OF THE PREFERRED EMBODIMENTS

Figure 1:
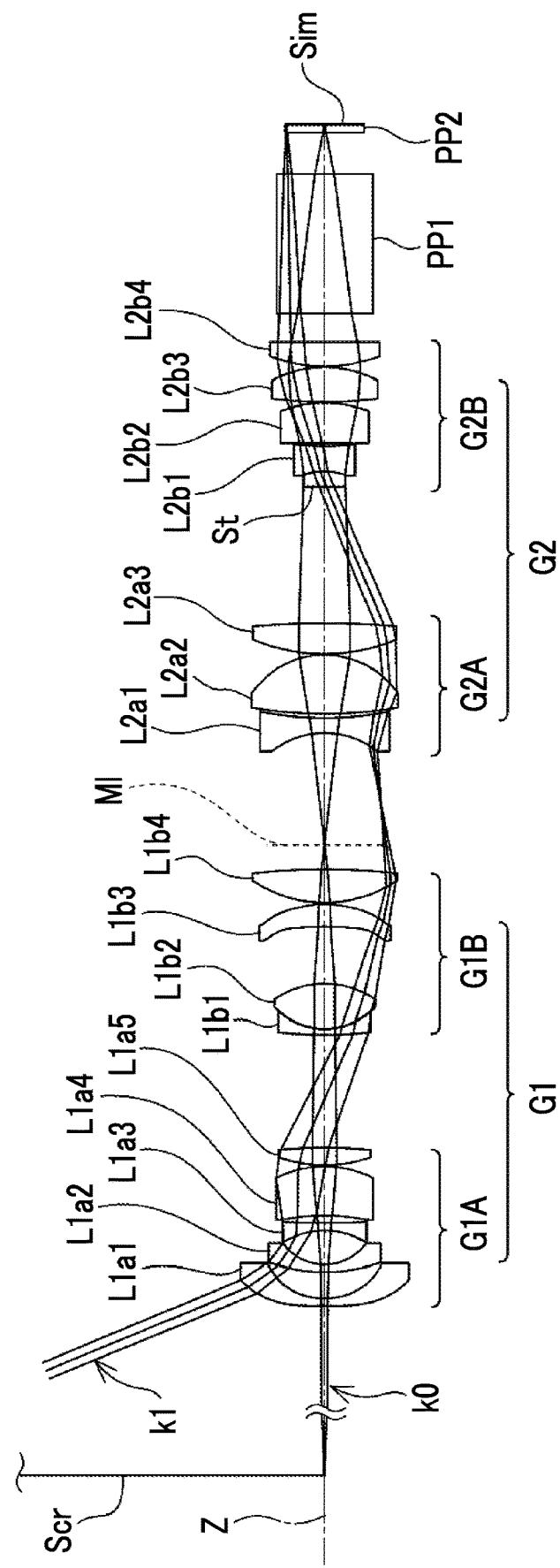
FIG. 1 is a cross-sectional view illustrating a configuration and an optical path of an imaging optical system of Example 1 of the present invention.

Hereinafter, embodiments of the present invention will be described with reference to drawings. FIG. 1 is a cross-sectional view illustrating a configuration of an imaging optical system according to an embodiment of the present invention. The exemplary configuration shown in FIG. 1 corresponds to Example 1 to be described later. In FIG. 1, the left side is the magnification side, and the right side is the reduction side, and on-axis rays k0 and rays with the maximum angle of view k1 are also shown.

The imaging optical system is an optical system that forms an intermediate image at a position conjugate to a reduction side imaging surface and forms the intermediate image again on a magnification side imaging surface. This imaging optical system is an optical system suitable as a projection optical system used for a projection display device and a video optical system used for a digital camera or the like.

In FIG. 1, assuming that the imaging optical system is mounted on a projection display device, the screen Scr, the optical member PP1, the optical member PP2, and the image display surface Sim of the light valve are also illustrated. The optical member PP1 and the optical member PP2 are members whose incident surface and exit surface are parallel. The optical member PP1 is a member such as a prism used in the color synthesizing section or the illumination light separating section, and the optical member PP2 is a member such as a filter or a cover glass. The optical member PP1 and the optical member PP2 are not indispensable components, and at least one of those may be omitted. It should be noted that FIG. 1 shows a configuration example in which a position of a reduction side surface of the optical member PP coincides with a position of the image display surface Sim, but such a configuration in which the positions are different may be possible.

In the projection display device, rays, which are made to have image information through the image display surface Sim, are incident into the imaging optical system through the optical member PP, and are transmitted onto a screen Scr through the imaging optical system. That is, in the example of FIG. 1, the image display surface Sim corresponds to the reduction side imaging surface, and the screen Scr corresponds to the magnification side imaging surface.

The imaging optical system consists of, in order from the magnification side to the reduction side: a first optical system G1 that includes a plurality of lenses; and a second optical system G2 that includes a plurality of lenses. The second optical system G2 forms an intermediate image MI at a position conjugate to a reduction side imaging surface, and the first optical system G1 re-forms the intermediate image MI on a magnification side imaging surface. That is, the imaging optical system consists of the first optical system G1, which is disposed on the magnification side, and the second optical system G2, which is disposed on the reduction side, with a forming position of the intermediate image MI interposed therebetween. In FIG. 1, the intermediate image MI is conceptually shown, and its position in the direction of the optical axis is basically shown as the position in the vicinity of the optical axis.

In the imaging optical system configured to form the intermediate image, it is possible to reduce a back focal length of the first optical system G1, and it is possible to reduce a lens diameter of the first optical system G1 on the magnification side. As a result, the system can be configured to be appropriate for achieving a wide angle by reducing the focal length of the whole system.

The first optical system G1 consists of, in order from the magnification side to the reduction side, a first A lens group G1A that has a positive refractive power as a whole, and a first B lens group G1B that has a positive refractive power as a whole and is separated from the first A lens group G1A by a maximum air gap on an optical axis between lens surfaces in the first optical system G1. That is, the first optical system G1 consists of a first A lens group G1A and a first B lens group G1B. The air gap is present between the first A lens group G1A and the first B lens group G1B such that the air gap on the optical axis between lens surfaces in the first optical system G1 is maximized.

The second optical system G2 consists of, in order from the magnification side to the reduction side, a second A lens group G2A that has a positive refractive power as a whole, and a second B lens group G2B that has a positive refractive power as a whole and is separated from the second A lens group G2A by a maximum air gap on the optical axis between lens surfaces in the second optical system G2. That is, the second optical system G2 consists of a second A lens group G2A and a second B lens group G2B. The air gap is present between the second A lens group G2A and the second B lens group G2B such that the air gap on the optical axis between lens surfaces in the second optical system G2 is maximized.

The first B lens group G1B, the second A lens group G2A, and the second B lens group G2B each are a lens group having a positive refractive power as a whole, and each includes only one negative lens. A negative lens included in the first B lens group G1B is only one lens which is disposed to be closest to the magnification side in the first B lens group G1B. A negative lens included in the second A lens group G2A is only one lens which is disposed to be closest to the magnification side in the second A lens group G2A. A negative lens included in the second B lens group G2B is only one lens which is disposed to be closest to the magnification side in the second B lens group G2B.

In the example shown in FIG. 1, the first A lens group G1A consists of five lenses L1a1 to L1a5 in order from the magnification side. The first B lens group G1B consists of four lenses L1b1 to L1b4 in order from the magnification side. The second A lens group G2A consists of three lenses L2a1 to L2a3 in order from the magnification side. The second B lens group G2B consists of an aperture stop St and four lenses L2b1 to L2b4 in order from the magnification side. In the example shown in FIG. 1, the lenses L1a1 to L1a3, L1b1, L2a1, and L2b1 are negative lenses, and the other lenses are positive lenses.

In the imaging optical system configured to form the intermediate image MI, it is necessary to form an intermediate image once inside the imaging optical system. Therefore, it becomes important to use a lot of positive lenses having a converging effect and to appropriately arrange the negative lenses from the viewpoint of aberration correction. In a case where a large number of negative lenses are used in combination with positive lenses, it is advantageous for achromatization and aberration correction. However, it is desirable to use the minimum number of necessary negative lenses in order to reduce the costs thereof. Therefore, in the imaging optical system of the present embodiment, in each of the first B lens group G1B, the second A lens group G2A, and the second B lens group G2B, it is possible to satisfactorily correct aberrations while using the minimum number of necessary negative lenses by setting only the lens closest to the magnification side in each lens group as a negative lens.

Specifically, a negative lens is disposed to be closest to the magnification side in the first B lens group G1B. Thereby, there is an advantage in correction of astigmatism. In addition, by cooperating the negative lens and the positive lens at a position closer to the reduction side than the negative lens, there is an advantage in correction of lateral chromatic aberration.

Since a negative lens is disposed to be closest to the magnification side in the second A lens group G2A, it is possible to cancel distortion occurring in the first optical system G1. Therefore, in order to correct the distortion in the first optical system G1, it is unnecessary to provide many lenses, and this configuration is able to contribute to reduction in the number of lenses.

Since a negative lens is disposed to be closest to the magnification side in the second B lens group G2B, there is an advantage in correction of spherical aberration. Further, by cooperating the negative lens and the positive lens at a position closer to the reduction side than the negative lens, there is an advantage in correction of longitudinal chromatic aberration.

As described above, by arranging the negative lenses at appropriate positions, it is possible to maintain favorable optical performance while setting the number of necessary lenses to the minimum.

It is preferable that all the first, second, and third lenses from the magnification side in the first A lens group G1A are negative lenses. By arranging three negative lenses consecutively from the most magnification side, there is an advantage in achieving the wide angle, and there is an advantage in correction of distortion and field curvature caused by the wide angle. In addition, the first A lens group G1A can be configured to consist of three negative lenses and two positive lenses in order from the magnification side. Alternatively, the first A lens group G1A can be configured to consist of three negative lenses and one positive lens in order from the magnification side.

The first B lens group G1B is a lens group having a positive refractive power, and thus has at least one positive lens. A positive lens is disposed to be adjacent to the negative lens on the reduction side in the negative lens closest to the magnification side in the first B lens group G1B. It is preferable that the negative lens closest to the magnification side in the first B lens group G1B and the positive lens disposed to be adjacent to the negative lens are cemented to each other on the reduction side in the negative lens. In such a case, there is an advantageous in correction of lateral chromatic aberration.

The first B lens group G1B may be configured to comprise only four lenses, which consists of one negative lens and three positive lenses, as lenses having refractive powers. That is, the first B lens group G1B may be configured to consist of, in order from the magnification side, a negative lens, a positive lens, a positive lens, and a positive lens. In such a case, it is possible to satisfactorily correct astigmatism while adopting the configuration using a small number of lenses.

The second A lens group G2A may be configured to comprise only three lenses, which consists of one negative lens and two positive lenses, as lenses having refractive powers. That is, the second A lens group G2A may be configured to consist of, in order from the magnification side, a negative lens, a positive lens, and a positive lens. In such a case, the negative lens closest to the magnification side is able to contribute to correction of distortion. Further, it is possible to reduce the diameter of the lens of the second A lens group G2A and to minimize the entire lens length by converging the light, which is spread through the negative lens, through two positive lenses.

The second B lens group G2B may be configured to comprise only four lenses, which consists of one negative lens and three positive lenses, as lenses having refractive powers. In such a case, it is possible to satisfactorily spherical aberration while ensuring a sufficient back focal length with a small number of lenses.

Hereinafter, preferred configurations relating to conditional expressions will be described. Assuming that a focal length of the imaging optical system is f and a focal length of the negative lens disposed to be closest to the magnification side in the first B lens group G1B is fn1B, it is preferable to satisfy Conditional Expression (1). By not allowing the result of Conditional Expression (1) to be equal to or less than the lower limit, it is possible to ensure the refractive power of the negative lens of the first B lens group G1B, and there is an advantage in correction of astigmatism. By not allowing the result of Conditional Expression (1) to be equal to or greater than the upper limit, it is possible to prevent the refractive power of the negative lens of the first B lens group G1B from becoming excessively strong, and it is possible to prevent excessive correction. As a result, this configuration is able to contribute to minimization of the number of positive lenses arranged at a position closer to the reduction side than the negative lens. In addition, in a case of a configuration in which Conditional Expression (1-1) is satisfied instead of Conditional Expression (1), it is possible to obtain more favorable characteristics.

$$-12 < fn1B/|f| < -2 \quad (1)$$

$$-8 < fn1B/|f| < -3 \quad (1\text{-}1)$$

Assuming that the focal length of the imaging optical system is f and a focal length of the negative lens disposed to be closest to the magnification side in the second A lens group G2A is fn2A, it is preferable to satisfy Conditional Expression (2). By not allowing the result of Conditional Expression (2) to be equal to or less than the lower limit, it is possible to ensure the refractive power of the negative lens of the second A lens group G2A. Thus, there is an advantage in correction of distortion, and this configuration is able to contribute to reduction of the number of lenses to be provided in the first optical system G1. By not allowing the result of Conditional Expression (2) to be equal to or greater than the upper limit, it is possible to prevent the refractive power of the negative lens of the second A lens group G2A from becoming excessively strong, and it is possible to prevent excessive correction. As a result, this configuration is able to contribute to minimization of the number of positive lenses arranged at a position closer to the reduction side than the negative lens. In addition, in a case of a configuration in which Conditional Expression (2-1) is satisfied instead of Conditional Expression (2), it is possible to obtain more favorable characteristics.

$$-12 < fn2A/|f| < -2 \quad (2)$$

$$-8 < fn2A/|f| < -3 \quad (2\text{-}1)$$

Assuming that the focal length of the imaging optical system is f and a focal length of the negative lens disposed to be closest to the magnification side in the second B lens group G2B is fn2B, it is preferable to satisfy Conditional Expression (3). By not allowing the result of Conditional Expression (3) to be equal to or less than the lower limit, it is possible to ensure the refractive power of the negative lens of the second B lens group G2B, and there is an advantage in correction of spherical aberration. By not allowing the result of Conditional Expression (3) to be equal to or greater than the upper limit, it is possible to prevent the refractive power of the negative lens of the second B lens group G2B from becoming excessively strong, and it is possible to prevent excessive correction. As a result, this configuration is able to contribute to minimization of the number of positive lenses arranged at a position closer to the reduction side than the negative lens. In addition, in a case of a configuration in which Conditional Expression (3-1) is satisfied instead of Conditional Expression (3), it is possible to obtain more favorable characteristics.

$$-12 < fn2B/|f| < -2 \quad (3)$$

$$-8 < fn2B/|f| < -3 \quad (3\text{-}1)$$

It is preferable to satisfy all Conditional Expressions (1) to (3). In a case where all Conditional Expressions (1) to (3) are satisfied, there is an advantage in maintaining favorable optical performance while satisfying the minimum number of necessary lenses.

Assuming that the focal length of the imaging optical system is f and a focal length of the first optical system G1 is f1, it is preferable to satisfy Conditional Expression (4). Conditional Expression (4) is a conditional expression relating to the relay magnification. In a case where the result of Conditional Expression (4) is equal to or less than the lower limit, the relay magnification becomes small, and the F number of the first optical system G1 tends to decrease. In a case where the wide angle and high performance are intended to be achieved with an optical system having a small F number, it is necessary to correct aberrations corresponding to such optical system, for example, spherical aberration and astigmatism. By not allowing the result of Conditional Expression (4) to be equal to or less than the lower limit, it is possible to prevent the F-number of the first optical system G1 from becoming excessively small. Therefore, there is an advantage in correction of spherical aberration and astigmatism while achieving the wide angle. In a case where the result of Conditional Expression (4) is equal to or greater than the upper limit, the relay magnification increases, and the size of the intermediate image MI tends to increase. By not allowing the result of Conditional Expression (4) to be equal to or greater than the upper limit, it is possible to minimize the size of the intermediate image MI. Therefore, it is possible to suppress an increase in lens diameter of the first optical system G1. Further, By not allowing the result of Conditional Expression (4) to be equal to or greater than the upper limit, it becomes easy to correct distortion and field curvature in the first optical system G1. In addition, in a case of a configuration in which Conditional Expression (4-1) is satisfied instead of Conditional Expression (4), it is possible to obtain more favorable characteristics.

$$1 < |f1/f| < 2.5 \quad (4)$$

$$1.3 < |f1/f| < 2.2 \quad (4\text{-}1)$$

Assuming that a focal length of the first A lens group G1A is f1A and a focal length of the first B lens group G1B is f1B, it is preferable to satisfy Conditional Expression (5). Conditional Expression (5) is an expression relating to allocation of the refractive powers of the first A lens group G1A and the first B lens group G1B in the first optical system G1. By not allowing the result of Conditional Expression (5) to be equal to or less than the lower limit, it is possible to prevent the refractive power of the first B lens group G1B from becoming excessively strong, and it becomes easy to correct distortion in the first B lens group G1B. By not allowing the result of Conditional Expression (5) to be equal to or greater than the upper limit, it is possible to prevent the refractive power of the first A lens group G1A from becoming excessively strong. Thereby, it is possible to minimize the angle formed by the optical axis Z and the principal ray of the off-axis rays incident into the second optical system G2 from the first optical system G1. As a result, it becomes easy to correct aberrations in the second optical system G2. In addition, in a case of a configuration in which Conditional Expression (5-1) is satisfied instead of Conditional Expression (5), it is possible to obtain more favorable characteristics.

$$0.1 < f1B/f1A < 0.9 \quad (5)$$

$$0.2 < f1B/f1A < 0.7 \quad (5\text{-}1)$$

Assuming that the focal length of the imaging optical system is f and a back focal length at an air conversion distance of the imaging optical system in a case where the reduction side is set as a back side is Bf, it is preferable to satisfy Conditional Expression (6). By not allowing the result of Conditional Expression (6) to be equal to or less than the lower limit, it is possible to ensure the back focal length. Thus, it becomes easy to dispose a color combining prism or the like, which is used in combination with the imaging optical system, in the projection display device. In addition, it is preferable to satisfy Conditional Expression (6-1). By not allowing the result of Conditional Expression (6-1) to be equal to or less than the lower limit, it is possible to increase an effect of Conditional Expression (6). By not allowing the result of Conditional Expression (6-1) to be equal to or greater than the upper limit, it is possible to suppress an increase in size of the entire lens system including the back focal length.

$$4 < Bf/|f| \quad (6)$$

$$7 < Bf/|f| < 15 \quad (6\text{-}1)$$

The above-mentioned preferred configurations and available configurations may be arbitrary combinations, and it is preferable to selectively adopt the configurations in accordance with required specification. According to the present embodiment, it is possible to realize an imaging optical system that has a wide angle of view while having a configuration using a small number of lenses by minimizing the number of lenses and that has high optical performance by satisfactorily correcting various aberrations. It should be noted that the term "configuration using a small number of lenses" described herein means that the total number of lenses in the whole system is equal to or less than 16, and the term "wide angle" means that the total angle of view is greater than 130 degrees.

Next, numerical examples of the imaging optical system of the present invention will be described. It should be noted that the numerical data pieces of the following examples are all normalized such that the focal length of the whole system is 1.00, and are rounded up to a predetermined number of decimal places.

EXAMPLE 1

A lens configuration and an optical path of an imaging optical system of Example 1 are shown in FIG. 1, and a configuration and an illustration method thereof is as described above. Therefore, repeated descriptions are partially omitted herein. The imaging optical system of Example 1 consists of, in order from the magnification side, a first optical system G1 and a second optical system G2. The first optical system G1 consists of, in order from the magnification side, a first A lens group G1A and a first B lens group G1B. The second optical system G2 consists of, in order from the magnification side, a second A lens group G2A and a second B lens group G2B. The first A lens group G1A consists of, in order from the magnification side, a negative lens L1a1, a negative lens L1a2, a negative lens L1a3, a positive lens L1a4, and a positive lens L1a5. The first B lens group G1B consists of, in order from the magnification side, a negative lens L1b1, a positive lens L1b2, a positive lens L1b3, and a positive lens L1b4. The second A lens group G2A consists of, in order from the magnification side, a negative lens L2a1, a positive lens L2a2, and a positive lens L2a3. The second B lens group G2B consists of, in order from the magnification side, an aperture stop St, a negative lens L2b1, a positive lens L2b2, a positive lens L2b3, and a positive lens L2b4.

Table 1 shows basic lens data of the imaging optical system of Example 1, Table 2 shows specification, and Table 3 shows aspheric surface coefficients thereof. In Table 1, the column of the surface number shows surface numbers. The surface closest to the magnification side is the first surface, and the surface numbers increase one by one toward the reduction side. The column of R shows radii of curvature of the respective surfaces. The column of D shows surface distances on the optical axis between the respective surfaces and the surfaces adjacent to the reduction side. Further, the column of Nd shows refractive indexes of the respective components at the d line (a wavelength of 587.6 nm (nanometers)), and the column of vd shows Abbe numbers of the respective components at the d line. Here, reference signs of radii of curvature of surface shapes convex toward the magnification side are set to be positive, and reference signs of radii of curvature of surface shapes convex toward the reduction side are set to be negative. Table 1 additionally shows the aperture stop St and the optical members PP1 and PP2. In Table 1, in a place of a surface number of a surface corresponding to the aperture stop St, the surface number and a term of (St) are noted. The distance from the lens surface closest to the reduction side to the image display surface Sim shown in Table 1 is a distance in a case where the distance from the lens surface closest to the magnification side to the magnification side imaging surface is a finite distance.

Table 2 shows, as specification of the imaging optical system, respective values of the absolute value |f| of the focal length, the back focal length Bf at the air conversion distance in a case where the reduction side is set as a back side, F number FNo., and the maximum total angle of view 2ω, on the basis of the d line. [°] in the place of 2ω indicates that the unit thereof is a degree.

In Table 1, the reference sign * is attached to surface numbers of aspheric surface S, and numerical values of the paraxial radius of curvature are written into the column of the radius of curvature of the aspheric surface. Table 3 shows surface numbers of the aspheric surface S, and aspheric surface coefficients of the respective aspheric surface S. The "E±n" (n: an integer) in numerical values of the aspheric surface coefficients of Table 3 indicates "×10$^{±n}$". The aspheric surface coefficients are values of the coefficients KA and Am (m=3, 4, 5, . . . , 20) in aspheric surface expression represented as the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is a paraxial curvature, KA and Am are aspheric surface coefficients, and Σ in the aspheric surface expression means the sum with respect to m.

TABLE 1

Example 1

| Surface Number | R | D | Nd | νd |
|---|---|---|---|---|
| *1 | 91.8669 | 0.4697 | 1.67790 | 54.89 |
| *2 | 5.0221 | 1.6247 | | |
| 3 | 10.8456 | 0.4695 | 1.89286 | 20.36 |
| 4 | 3.4009 | 2.1133 | | |
| 5 | −5.2458 | 0.4692 | 1.72916 | 54.68 |
| 6 | 54.7851 | 0.4713 | | |
| 7 | −13.4414 | 3.0143 | 1.85025 | 30.05 |
| 8 | −7.0612 | 0.0934 | | |
| 9 | 9.4758 | 1.0823 | 1.80400 | 46.58 |
| 10 | −29.2741 | 7.0431 | | |
| 11 | 23.7878 | 0.3756 | 1.84666 | 23.78 |
| 12 | 4.5246 | 2.8043 | 1.59282 | 68.62 |
| 13 | −5.8404 | 3.6293 | | |
| *14 | −13.6687 | 1.4090 | 1.58313 | 59.38 |
| *15 | −4.7778 | 0.0935 | | |
| 16 | 8.5114 | 2.0742 | 1.49700 | 81.61 |
| 17 | −45.0381 | 8.5031 | | |
| 18 | −5.6412 | 0.9394 | 1.80000 | 29.84 |
| 19 | 21.4451 | 0.2625 | | |
| 20 | 28.6338 | 3.6946 | 1.54072 | 47.23 |

TABLE 1-continued

Example 1

| Surface Number | R | D | Nd | νd |
|---|---|---|---|---|
| 21 | −5.7519 | 0.0465 | | |
| 22 | 12.1571 | 1.9257 | 1.80000 | 29.84 |
| 23 | −55.8535 | 8.5163 | | |
| 24(St) | ∞ | 0.9392 | | |
| 25 | −4.3058 | 1.5784 | 1.84666 | 23.78 |
| 26 | 14.6868 | 0.1857 | | |
| 27 | −898.3003 | 2.5462 | 1.59282 | 68.62 |
| 28 | −7.5080 | 0.0473 | | |
| 29 | 30.1814 | 2.1192 | 1.53775 | 74.70 |
| 30 | −7.3233 | 0.0472 | | |
| 31 | 10.0081 | 1.5265 | 1.69680 | 55.53 |
| 32 | ∞ | 1.7842 | | |
| 33 | ∞ | 8.6862 | 1.63854 | 55.38 |
| 34 | ∞ | 2.6301 | | |
| 35 | ∞ | 0.5165 | 1.51633 | 64.14 |
| 36 | ∞ | | | |

TABLE 2

Example 1

| | |
|---|---|
| \|f\| | 1.00 |
| Bf | 10.04 |
| FNo. | 2.40 |
| 2ω[°] | 137.4 |

TABLE 3

Example 1

| Surface Number | 1 | 2 |
|---|---|---|
| KA | 1.000000000000E+00 | 1.000000000000E+00 |
| A4 | 2.649365129538E−03 | 1.664024848793E−03 |
| A6 | −4.491470147814E−05 | −4.274549643876E−05 |
| A8 | 6.885310633761E−08 | 2.323222315516E−05 |
| A10 | 1.443223577451E−08 | −3.103045507732E−07 |
| A12 | −2.607559999570E−11 | −6.672884634866E−08 |
| A14 | −7.350641231103E−12 | −1.806402706529E−09 |
| A16 | 1.721655858060E−13 | 2.563687740837E−10 |

| Surface Number | 14 | 15 |
|---|---|---|
| KA | 4.512956638100E−01 | 7.359871168596E−01 |
| A3 | 1.853827571488E−03 | 1.241566222399E−03 |
| A4 | 1.419023202978E−02 | 1.487003856475E−02 |
| A5 | −5.973482676195E−03 | 2.691814600881E−03 |
| A6 | −1.082291863847E−03 | −5.356500596335E−03 |
| A7 | 1.142169527966E−03 | −1.776210920103E−04 |
| A8 | −6.315283417514E−04 | 1.574070851043E−03 |
| A9 | 2.279945116005E−04 | −3.638062013848E−04 |
| A10 | 1.159794811555E−04 | −2.057973139855E−04 |
| A11 | −1.110221629935E−04 | 9.366928262557E−05 |
| A12 | 1.970336882685E−06 | 9.090028527954E−06 |
| A13 | 1.662530441335E−05 | −9.984943221188E−06 |
| A14 | −2.223185521410E−06 | 4.273203147137E−07 |
| A15 | −1.239657189713E−06 | 5.396853640766E−07 |
| A16 | 2.332841734569E−07 | −6.011836164277E−08 |
| A17 | 4.702503482364E−08 | −1.448999557441E−08 |
| A18 | −1.027320729267E−08 | 2.247329346777E−09 |
| A19 | −7.270947706602E−10 | 1.520370138645E−10 |
| A20 | 1.714729447122E−10 | −2.880011567855E−11 |

Figure 4:
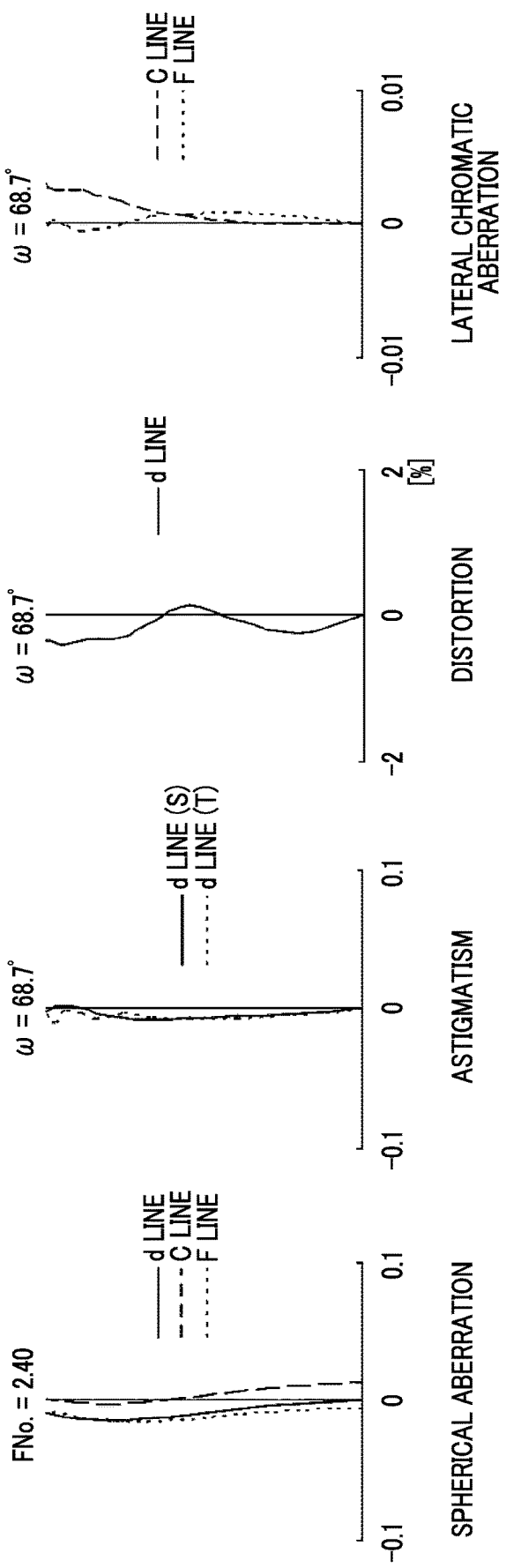
FIG. 4 is a diagram of aberrations of the imaging optical system of Example 1 of the present invention.

FIG. 4 shows aberration diagrams of spherical aberration, astigmatism, distortion, and lateral chromatic aberration of the imaging optical system of Example 1 in order from the left side. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view. The diagrams shown in FIG. 4 are diagrams in a case where the distance on the optical axis from the lens surface closest to the magnification side to the magnification side imaging surface is 79.8195.

In the description of Example 1, reference signs, meanings, and description methods of the respective data pieces are the same as those in the following examples unless otherwise noted. Therefore, in the following description, repeated description will be omitted.

EXAMPLE 2

Figure 2:
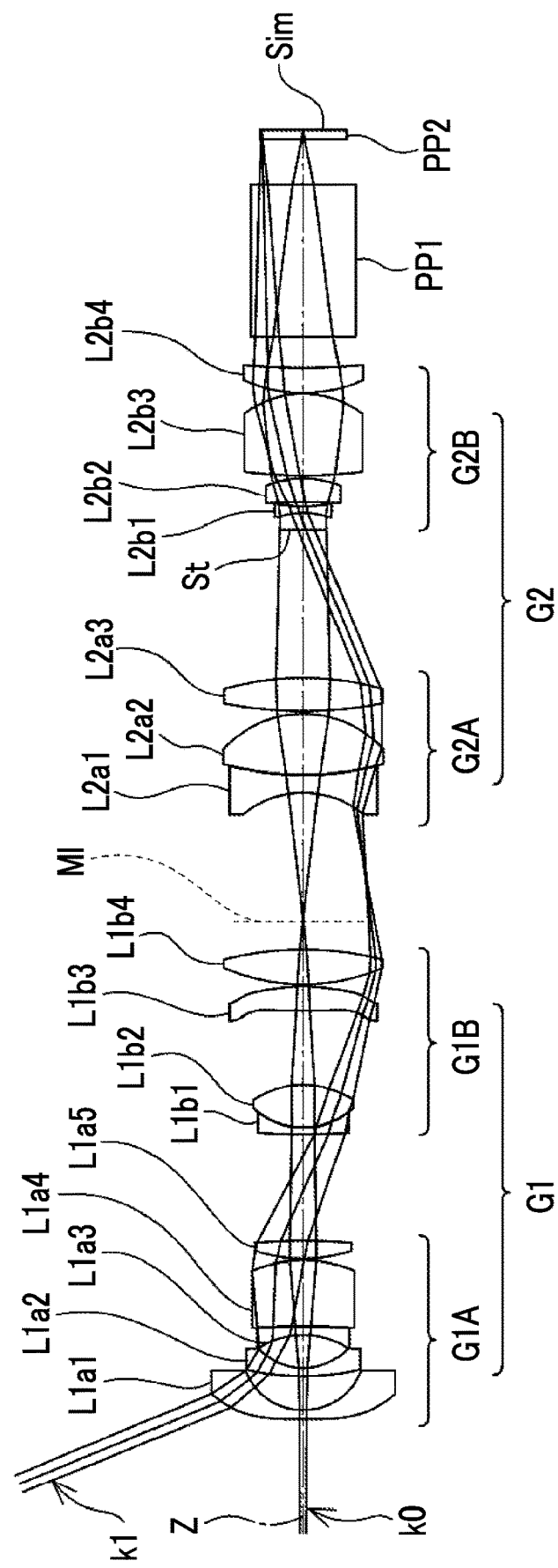
FIG. 2 is a cross-sectional view illustrating a configuration and an optical path of an imaging optical system of Example 2 of the present invention.

FIG. 2 is a cross-sectional view of a lens configuration and an optical path of an imaging optical system of Example 2. The imaging optical system of Example 2 consists of, in order from the magnification side, a first optical system G1 and a second optical system G2. The first optical system G1 consists of, in order from the magnification side, a first A lens group G1A and a first B lens group G1B. The second optical system G2 consists of, in order from the magnification side, a second A lens group G2A and a second B lens group G2B. The first A lens group G1A consists of, in order from the magnification side, a negative lens L1a1, a negative lens L1a2, a negative lens L1a3, a positive lens L1a4, and a positive lens L1a5. The first B lens group G1B consists of, in order from the magnification side, a negative lens L1b1, a positive lens L1b2, a positive lens L1b3, and a positive lens L1b4. The second A lens group G2A consists of, in order from the magnification side, a negative lens L2a1, a positive lens L2a2, and a positive lens L2a3. The second B lens group G2B consists of, in order from the magnification side, an aperture stop St, a negative lens L2b1, a positive lens L2b2, a positive lens L2b3, and a positive lens L2b4.

Figure 5:
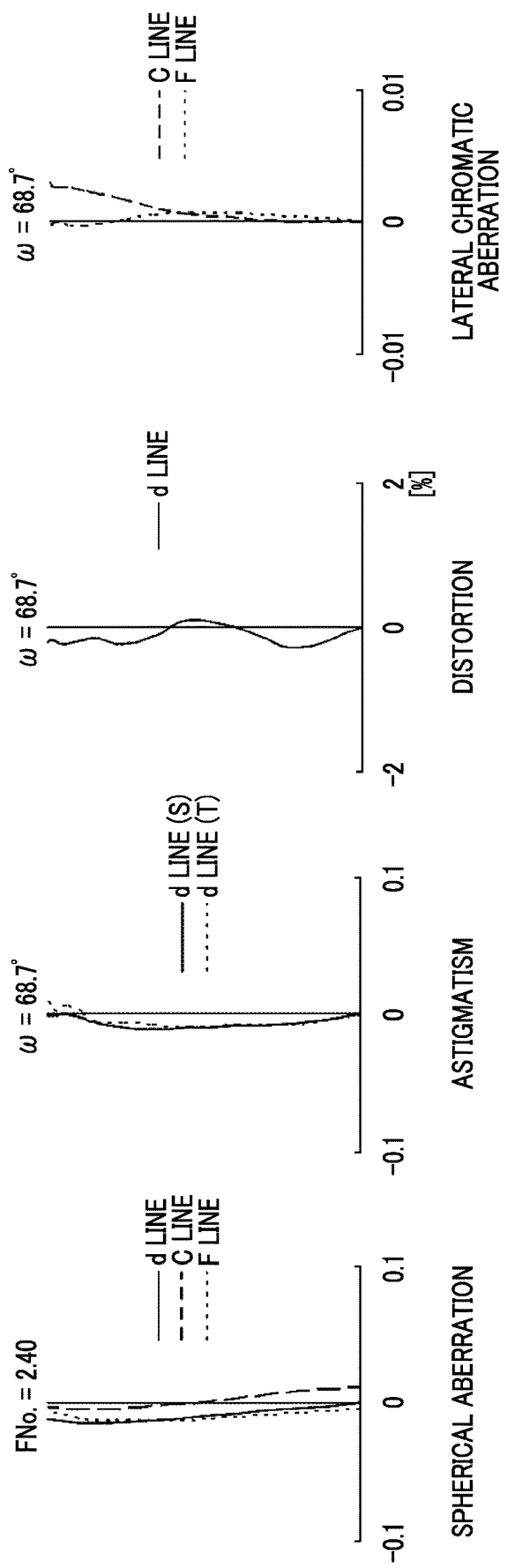
FIG. 5 is a diagram of aberrations of the imaging optical system of Example 2 of the present invention.

Table 4 shows basic lens data of the imaging optical system of Example 2, Table 5 shows specification, Table 6 shows aspheric surface coefficients, and FIG. 5 shows aberration diagrams. The diagrams shown in FIG. 5 are diagrams in a case where the distance on the optical axis from the lens surface closest to the magnification side to the magnification side imaging surface is 79.9475.

TABLE 4

Example 2

| Surface Number | R | D | Nd | νd |
|---|---|---|---|---|
| *1 | 86.7234 | 0.5352 | 1.67790 | 54.89 |
| *2 | 4.0560 | 1.9350 | | |
| 3 | 15.2922 | 0.4699 | 1.89286 | 20.36 |
| 4 | 3.6367 | 1.8891 | | |
| 5 | −5.0367 | 0.5081 | 1.72916 | 54.68 |
| 6 | −41.3377 | 3.7621 | 1.85025 | 30.05 |
| 7 | −8.0887 | 0.0943 | | |
| 8 | 9.3356 | 1.0194 | 1.80400 | 46.58 |
| 9 | −36.3306 | 6.1132 | | |
| 10 | 49.5556 | 0.3767 | 1.84666 | 23.78 |
| 11 | 4.4103 | 2.4449 | 1.59282 | 68.62 |
| 12 | −5.5234 | 4.2394 | | |

TABLE 4-continued

Example 2

| Surface Number | R | D | Nd | νd |
|---|---|---|---|---|
| *13 | −43.7894 | 1.4113 | 1.58313 | 59.38 |
| *14 | −5.9331 | 0.0936 | | |
| 15 | 11.9994 | 1.9916 | 1.59282 | 68.62 |
| 16 | −19.3937 | 9.0077 | | |
| 17 | −5.6390 | 0.9409 | 1.80518 | 25.42 |
| 18 | 18.2500 | 3.4954 | 1.64769 | 33.79 |
| 19 | −6.4845 | 0.1632 | | |
| 20 | 25.5301 | 1.9036 | 1.80518 | 25.42 |
| 21 | −17.2972 | 8.4891 | | |
| 22(St) | ∞ | 0.9409 | | |
| 23 | −4.9351 | 0.3758 | 1.84666 | 23.78 |
| 24 | 8.1269 | 0.2497 | | |
| 25 | −33.1578 | 1.4187 | 1.59282 | 68.62 |
| 26 | −5.8473 | 0.1482 | | |
| 27 | 27.0030 | 4.7032 | 1.59282 | 68.62 |
| 28 | −5.8025 | 0.0466 | | |
| 29 | 8.9142 | 1.4387 | 1.62041 | 60.29 |
| 30 | 38.8188 | 1.7871 | | |
| 31 | ∞ | 8.7002 | 1.63854 | 55.38 |
| 32 | ∞ | 2.6363 | | |
| 33 | ∞ | 0.5173 | 1.51633 | 64.14 |
| 34 | ∞ | | | |

TABLE 5

Example 2

| | |
|---|---|
| \|f\| | 1.00 |
| Bf | 10.06 |
| FNo. | 2.40 |
| 2ω[°] | 137.4 |

TABLE 6

Example 2

| Surface Number | 1 | 2 |
|---|---|---|
| KA | 1.000000000000E+00 | 1.000000000000E+00 |
| A4 | 2.424459036134E−03 | 1.134599307960E−03 |
| A6 | −4.454830046423E−05 | −9.679801376807E−05 |
| A8 | 1.425265262233E−07 | 3.845783937354E−05 |
| A10 | 1.371306437308E−08 | −3.678418966588E−07 |
| A12 | −2.170490577948E−11 | −1.781596708245E−07 |
| A14 | −4.795525981496E−12 | 1.161647694130E−09 |
| A16 | 4.658085814078E−14 | 6.166093801526E−10 |

| Surface Number | 13 | 14 |
|---|---|---|
| KA | −3.376988072125E+00 | 7.872018138400E−01 |
| A3 | 9.528860888492E−03 | 7.853911493286E−03 |
| A4 | 2.797932703491E−03 | 7.146295826835E−03 |
| A5 | −2.016142115180E−03 | 4.953269825209E−03 |
| A6 | 2.239707630531E−03 | −3.088265527167E−03 |
| A7 | −1.311358564912E−03 | −1.625954082732E−03 |
| A8 | −8.720628528504E−04 | 1.236946975319E−03 |
| A9 | 7.803777461083E−04 | 4.307731336383E−05 |
| A10 | 6.867947203287E−05 | −1.992042415635E−04 |
| A11 | −1.711854300705E−04 | 2.979714383583E−05 |
| A12 | 1.182953870870E−05 | 1.445968143059E−05 |
| A13 | 1.951027934444E−05 | −4.212098700827E−06 |
| A14 | −2.792159927043E−06 | −3.814468597209E−07 |
| A15 | −1.236607438586E−06 | 2.435552712624E−07 |
| A16 | 2.291955706456E−07 | −7.783273056747E−09 |
| A17 | 4.160575678808E−08 | −6.544276028068E−09 |
| A18 | −8.782826005318E−09 | 6.198811266210E−10 |
| A19 | −5.827438388101E−10 | 6.625275081798E−11 |
| A20 | 1.322139599254E−10 | −9.054427704936E−12 |

EXAMPLE 3

Figure 3:
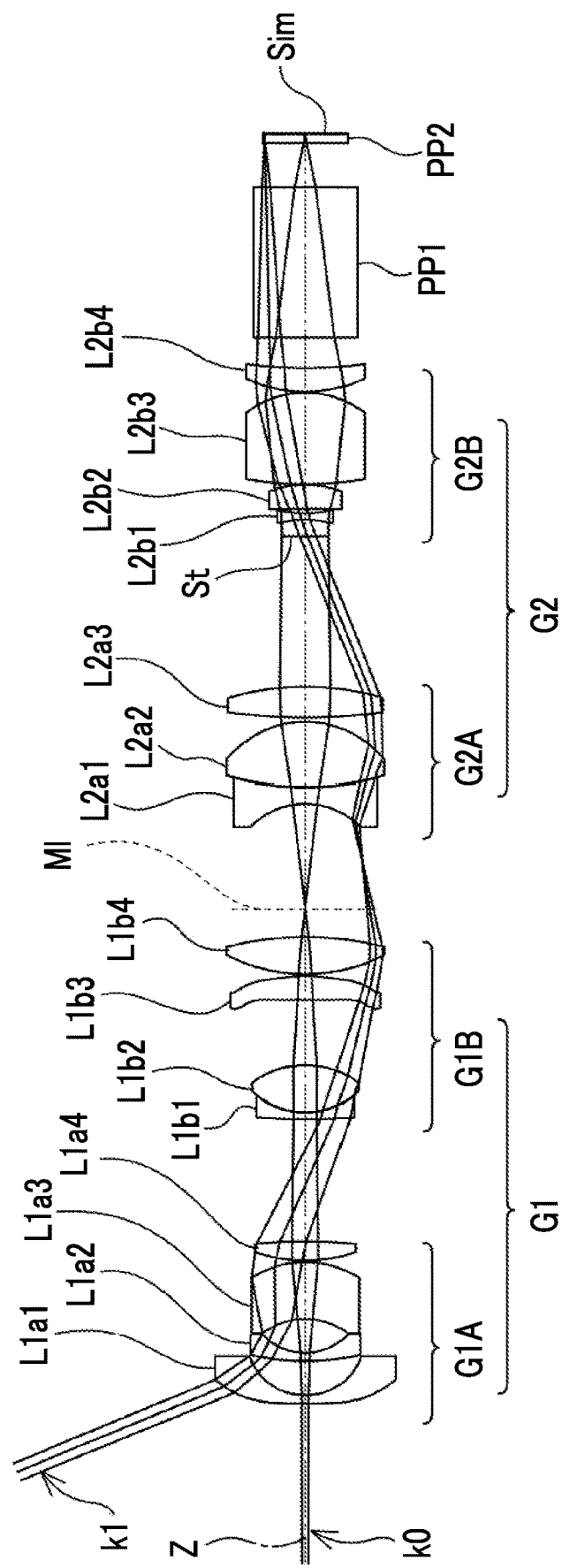
FIG. 3 is a cross-sectional view illustrating a configuration and an optical path of an imaging optical system of Example 3 of the present invention.

FIG. 3 is a cross-sectional view of a lens configuration and an optical path of an imaging optical system of Example 3. The imaging optical system of Example 3 consists of, in order from the magnification side, a first optical system G1 and a second optical system G2. The first optical system G1 consists of, in order from the magnification side, a first A lens group G1A and a first B lens group G1B. The second optical system G2 consists of, in order from the magnification side, a second A lens group G2A and a second B lens group G2B. The first A lens group G1A consists of, in order from the magnification side, a negative lens L1a1, a negative lens L1a2, a negative lens L1a3, and a positive lens L1a4. The first B lens group G1B consists of, in order from the magnification side, a negative lens L1b1, a positive lens L1b2, a positive lens L1b3, and a positive lens L1b4. The second A lens group G2A consists of, in order from the magnification side, a negative lens L2a1, a positive lens L2a2, and a positive lens L2a3. The second B lens group G2B consists of, in order from the magnification side, an aperture stop St, a negative lens L2b1, a positive lens L2b2, a positive lens L2b3, and a positive lens L2b4.

Figure 6:
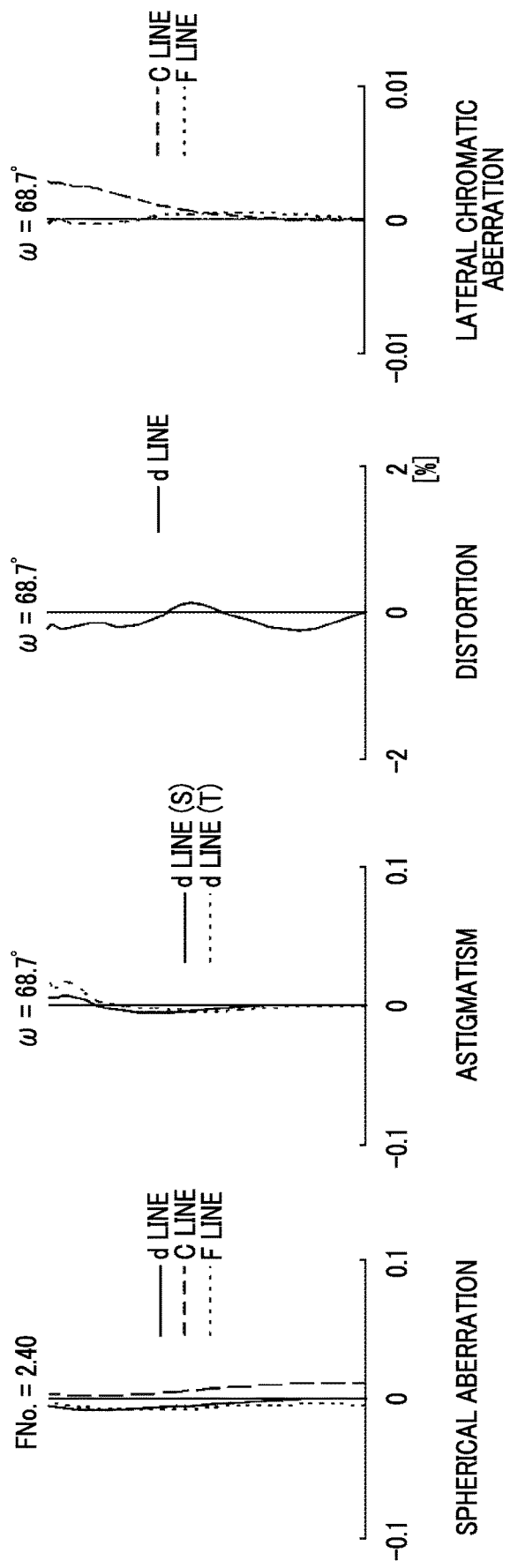
FIG. 6 is a diagram of aberrations of the imaging optical system of Example 3 of the present invention.

Table 7 shows basic lens data of the imaging optical system of Example 3, Table 8 shows specification, Table 9 shows aspheric surface coefficients, and FIG. 6 shows aberration diagrams. The diagrams shown in FIG. 6 are diagrams in a case where the distance on the optical axis from the lens surface closest to the magnification side to the magnification side imaging surface is 79.9876.

TABLE 7

Example 3

| Surface Number | R | D | Nd | νd |
|---|---|---|---|---|
| *1 | 195.7142 | 0.4975 | 1.67790 | 54.89 |
| *2 | 4.0109 | 1.9993 | | |
| 3 | 15.4926 | 0.4704 | 1.89286 | 20.36 |
| 4 | 3.6610 | 2.0240 | | |
| 5 | −4.3369 | 3.2936 | 1.80400 | 46.58 |
| 6 | −6.2607 | 0.0939 | | |
| 7 | 9.5074 | 1.1141 | 1.80100 | 34.97 |
| 8 | −29.7013 | 7.1124 | | |
| 9 | 41.2890 | 0.3764 | 1.84666 | 23.78 |
| 10 | 4.6550 | 2.7745 | 1.59282 | 68.62 |
| 11 | −5.5334 | 3.7706 | | |
| *12 | −36.4465 | 1.4119 | 1.58313 | 59.38 |
| *13 | −6.0679 | 0.0937 | | |
| 14 | 10.4561 | 2.1548 | 1.53775 | 74.70 |
| 15 | −19.5668 | 7.7742 | | |
| 16 | −4.6604 | 0.9410 | 1.80518 | 25.42 |
| 17 | 17.1849 | 3.7392 | 1.68893 | 31.07 |
| 18 | −6.1674 | 0.2538 | | |
| 19 | 35.5107 | 1.8035 | 1.80518 | 25.42 |
| 20 | −16.3231 | 8.7583 | | |
| 21(St) | ∞ | 0.9410 | | |
| 22 | −5.7953 | 0.3769 | 1.84666 | 23.78 |
| 23 | 7.5245 | 0.2447 | | |
| 24 | −59.2061 | 1.4003 | 1.59282 | 68.62 |
| 25 | −6.1572 | 0.0472 | | |
| 26 | 21.6801 | 5.3374 | 1.59282 | 68.62 |
| 27 | −5.9345 | 0.0473 | | |
| 28 | 8.6732 | 1.3851 | 1.62041 | 60.29 |
| 29 | 26.5304 | 1.7880 | | |
| 30 | ∞ | 8.7045 | 1.63854 | 55.38 |
| 31 | ∞ | 2.6384 | | |
| 32 | ∞ | 0.5176 | 1.51633 | 64.14 |
| 33 | ∞ | | | |

TABLE 8

Example 3

| | |
|---|---|
| \|f\| | 1.00 |
| Bf | 10.07 |
| FNo. | 2.40 |
| 2ω[°] | 137.4 |

TABLE 9

Example 3

| Surface Number | 1 | 2 |
|---|---|---|
| KA | 1.000000000000E+00 | 1.000000000000E+00 |
| A4 | 2.761684492818E−03 | 1.794225357163E−03 |
| A6 | −6.246578073046E−05 | −2.297701275211E−04 |
| A8 | 4.140433330214E−07 | 6.390504272154E−05 |
| A10 | 1.850176020077E−08 | −1.300027385378E−06 |
| A12 | −1.251500588244E−10 | −3.264024360673E−07 |
| A14 | −8.190068755840E−12 | 1.420116882346E−08 |
| A16 | 1.051915766144E−13 | 5.224918956140E−10 |

| Surface Number | 12 | 13 |
|---|---|---|
| KA | −1.414363774820E+00 | 8.532665666175E−01 |
| A3 | −4.396915068565E−03 | −2.101820325099E−03 |
| A4 | 2.009864308208E−02 | 1.476005217856E−02 |
| A5 | −5.242062773915E−03 | 7.396175716689E−03 |
| A6 | −4.077973441656E−03 | −7.521450114392E−03 |
| A7 | 2.084828479300E−03 | −1.231713511214E−03 |
| A8 | 7.386300257750E−05 | 2.389216911711E−03 |
| A9 | −2.174674833777E−04 | −2.585819610699E−04 |
| A10 | 5.915668616810E−05 | −3.468681050614E−04 |
| A11 | −1.629313322487E−05 | 8.951217400914E−05 |
| A12 | −4.570522312670E−06 | 2.330458142127E−05 |
| A13 | 5.338692400288E−06 | −1.009324896771E−05 |
| A14 | −3.640832533956E−07 | −4.706710030318E−07 |
| A15 | −4.656011846753E−07 | 5.584816605192E−07 |
| A16 | 6.458319004926E−08 | −2.462968978601E−08 |
| A17 | 1.837590939390E−08 | −1.530278916891E−08 |
| A18 | −3.164772063237E−09 | 1.442639082346E−09 |
| A19 | −2.822921924114E−10 | 1.652754263186E−10 |
| A20 | 5.396683695968E−11 | −2.087841199729E−11 |

Table 10 shows values corresponding to Conditional Expressions (1) to (6) of the imaging optical systems of Examples 1 to 3. In Examples 1 to 3, the d line is set as the reference wavelength, and the values shown in Table 10 are based on the d line.

TABLE 10

| Expression Number | | Example 1 | Example 2 | Example 3 |
|---|---|---|---|---|
| (1) | fn1B/\|f\| | −6.66 | −5.74 | −6.23 |
| (2) | fn2A/\|f\| | −5.50 | −5.26 | −4.47 |
| (3) | fn2B/\|f\| | −3.79 | −3.58 | −3.82 |
| (4) | \|f1\|/\|f\| | 1.73 | 1.76 | 1.70 |
| (5) | f1B/f1A | 0.40 | 0.49 | 0.37 |
| (6) | Bf/\|f\| | 10.04 | 10.06 | 10.07 |

As can be seen from the above data, in each imaging optical system of Examples 1 to 3, the number of lenses constituting the whole system is 15 or 16, the wide angle is achieved such that the total angle of view is equal to or greater than 135°, and the F number is 2.4. Thereby, various aberrations are satisfactorily corrected, and high optical performance is achieved.

Figure 7:
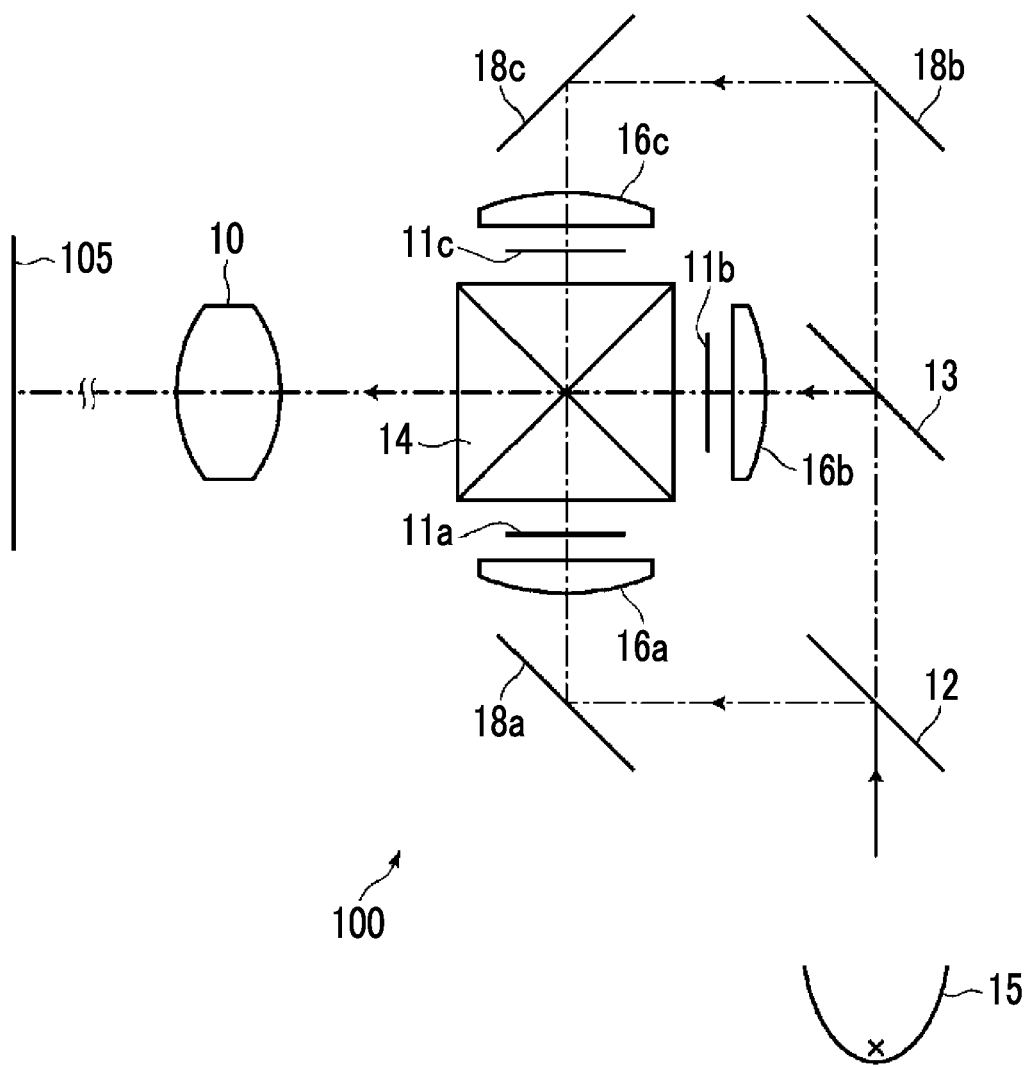
FIG. 7 is a schematic configuration diagram of a projection display device according to an embodiment of the present invention.

Next, a projection display device according to an embodiment of the present invention will be described. FIG. 7 is a schematic configuration diagram of the projection display device according to the above-mentioned embodiment of the present invention. The projection display device 100 shown in FIG. 7 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical path. In FIG. 7, the imaging optical system 10 is schematically illustrated. Further, an integrator is disposed between the light source 15 and the dichroic mirror 12, but illustration thereof is omitted in FIG. 7.

White light originated from the light source 15 is separated into rays with three colors (green light, blue light, red light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the modulated light modulated through the transmissive display elements 11a to 11c, onto a screen 105.

Figure 8:
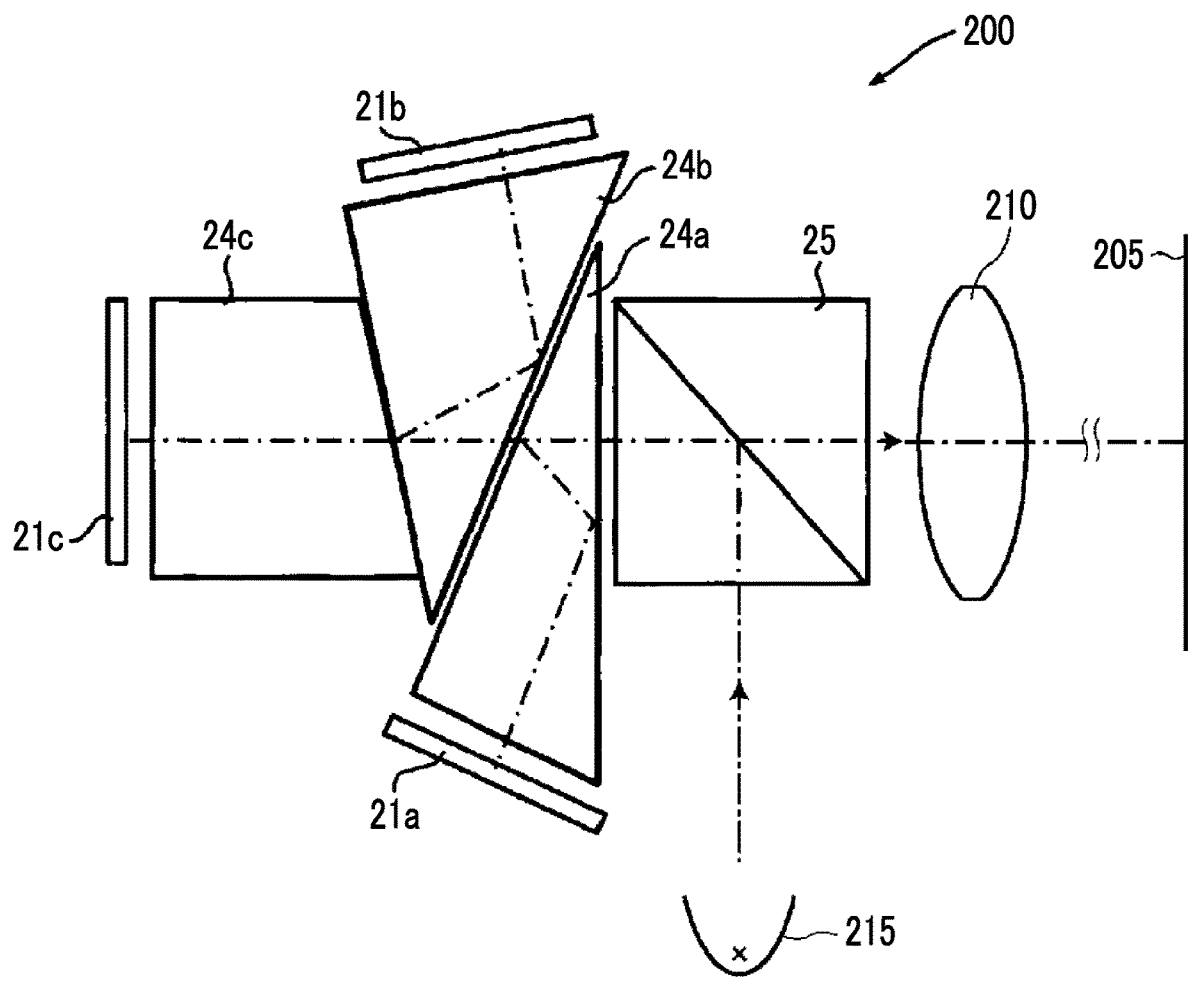
FIG. 8 is a schematic configuration diagram of a projection display device according to another embodiment of the present invention.

FIG. 8 is a schematic configuration diagram of a projection display device according to another embodiment of the present invention. The projection display device 200 shown in FIG. 8 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 8, the imaging optical system 210 is schematically illustrated. Further, an integrator is disposed between the light source 215 and the polarization separating prism 25, but illustration thereof is omitted in FIG. 8.

White light originated from the light source 215 is reflected on a reflective surface inside the polarization separating prism 25, and is separated into rays with three colors (green light, blue light, red light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the modulated light modulated through the DMD elements 21a to 21c, onto a screen 205.

Figure 9:
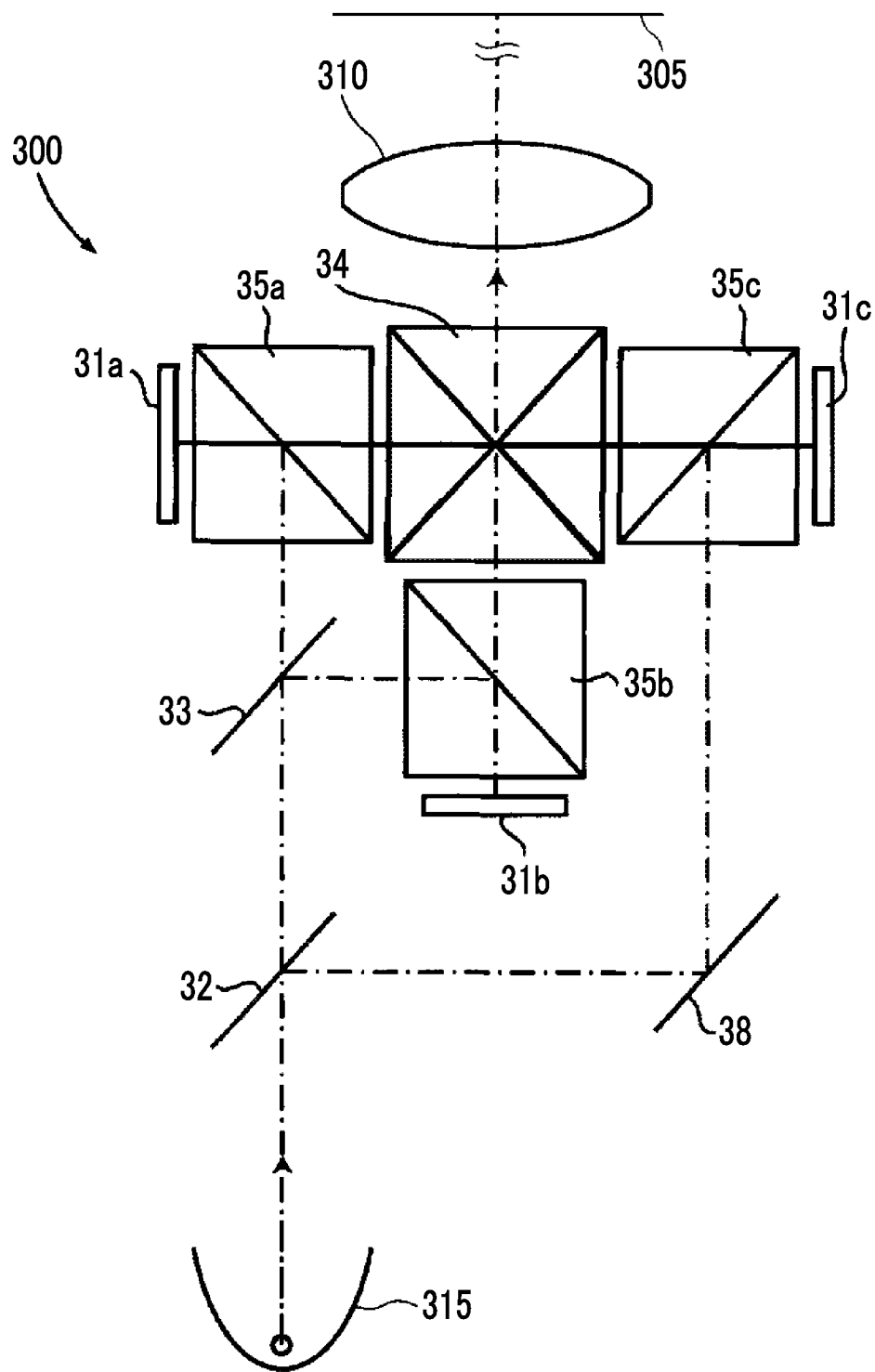
FIG. 9 is a schematic configuration diagram of a projection display device according to still another embodiment of the present invention.

FIG. 9 is a schematic configuration diagram of a projection display device according to still another embodiment of the present invention. The projection display device 300 shown in FIG. 9 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical path, and polarization separating prisms 35a to 35c. In FIG. 9, the imaging optical system 310 is schematically illustrated. Further, an integrator is disposed between the light source 315 and the dichroic mirror 32, but illustration thereof is omitted in FIG. 9.

White light originated from the light source 315 is separated into rays with three colors (green light, blue light, red light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the modulated light modulated through the reflective display elements 31a to 31c, onto a screen 305.

Figure 10:
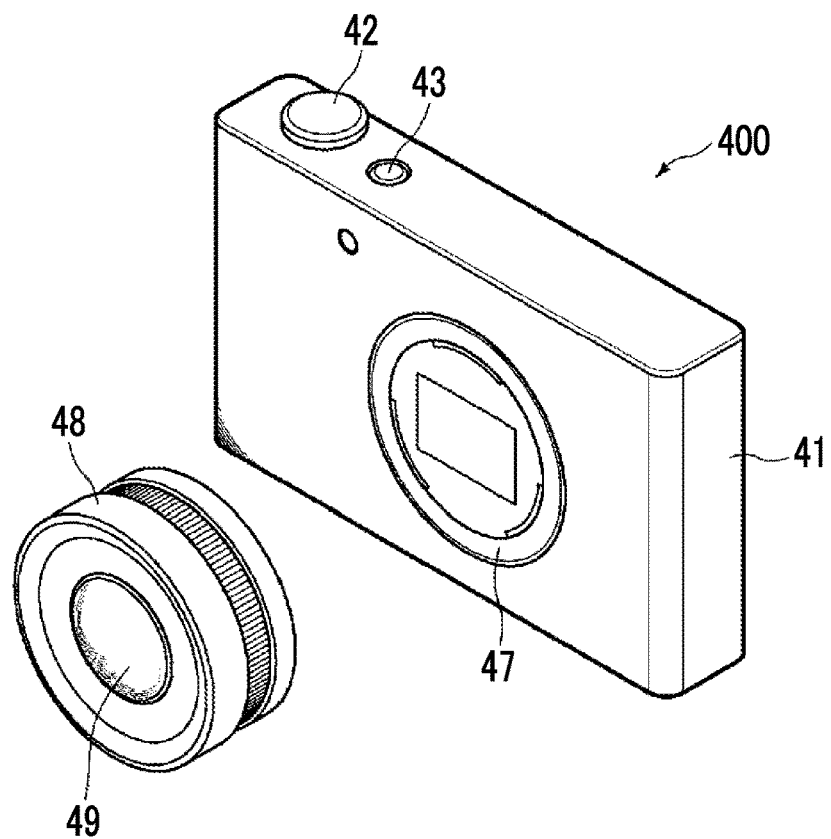
FIG. 10 is a perspective view of the front side of an imaging apparatus according to an embodiment of the present invention.
Figure 11:
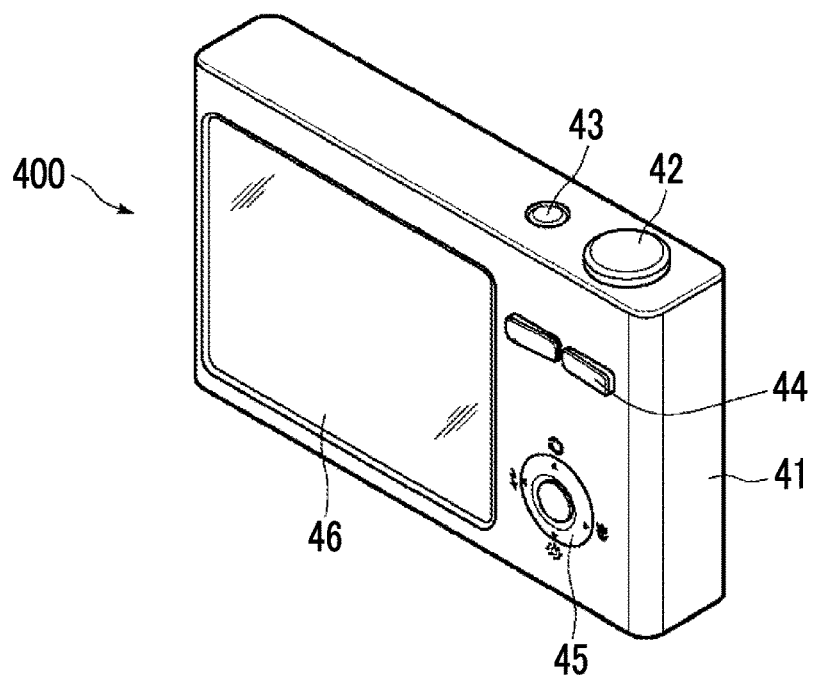
FIG. 11 is a perspective view of the rear side of the imaging apparatus shown in FIG. 10.

FIGS. 10 and 11 are external views of a camera 400 which is the imaging apparatus according to the above-mentioned embodiment of the present invention. FIG. 10 is a perspective view of the camera 400 viewed from the front side, and FIG. 11 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 is able to capture a still image or a moving image by pressing the shutter button 42, and is able to store image data, which is obtained through imaging, in the storage medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

The projection display device of the present invention is also not limited to the above-mentioned configuration, and various modifications of the optical member and the light valve used for the ray separation or the ray synthesis, for example, can be made.

Further, the imaging apparatus of the present invention is not limited to the above configuration. For example, the present invention can be applied to a single-lens reflex camera, a film camera, a video camera, or the like.

What is claimed is:

1. An imaging optical system consisting of, in order from a magnification side to a reduction side:
   a first optical system that includes a plurality of lenses; and
   a second optical system that includes a plurality of lenses,
   wherein the second optical system forms an intermediate image at a position conjugate to a reduction side imaging surface, and the first optical system re-forms the intermediate image on a magnification side imaging surface,
   wherein the first optical system consists of, in order from the magnification side to the reduction side, a first A lens group that has a positive refractive power as a whole, and a first B lens group that has a positive refractive power as a whole and is separated from the first A lens group by a maximum air gap on an optical axis between lens surfaces in the first optical system,
   wherein the second optical system consists of, in order from the magnification side to the reduction side, a second A lens group that has a positive refractive power as a whole, and a second B lens group that has a positive refractive power as a whole and is separated from the second A lens group by a maximum air gap on the optical axis between lens surfaces in the second optical system,
   wherein a negative lens included in the first B lens group is only a lens which is disposed to be closest to the magnification side in the first B lens group,
   wherein a negative lens included in the second A lens group is only a lens which is disposed to be closest to the magnification side in the second A lens group, and
   wherein a negative lens included in the second B lens group is only a lens which is disposed to be closest to the magnification side in the second B lens group.

2. The imaging optical system according to claim 1, wherein assuming that a focal length of the imaging optical system is f, a focal length of the negative lens disposed to be closest to the magnification side in the first B lens group is fn1B, a focal length of the negative lens disposed to be closest to the magnification side in the second A lens group is fn2A, and a focal length of the negative lens disposed to be closest to the magnification side in the second B lens group is fn2B, all Conditional Expressions (1) to (3) are satisfied, $$-12 < fn1B/|f| < -2 \quad (1)$$

$$-12 < fn2A/|f| < -2 \quad (2)$$

$$-12 < fn2B/|f| < -2 \quad (3).$$

3. The imaging optical system according to claim 2, wherein Conditional Expression (1-1) is satisfied, $$-8 < fn1B/|f| < -3 \quad (1-1).$$

4. The imaging optical system according to claim 2, wherein Conditional Expression (2-1) is satisfied, $$-8 < fn2A/|f| < -3 \quad (2-1).$$

5. The imaging optical system according to claim 2, wherein Conditional Expression (3-1) is satisfied, $$-8 < fn2B/|f| < -3 \quad (3-1).$$

6. The imaging optical system according to claim 1, wherein assuming that a focal length of the imaging optical system is f and a focal length of the first optical system is f1, Conditional Expression (4) is satisfied, $$1 < |f1/f| < 2.5 \quad (4).$$

7. The imaging optical system according to claim 6, wherein Conditional Expression (4-1) is satisfied, $$1.3 < |f1/f| < 2.2 \quad (4-1).$$

8. The imaging optical system according to claim 1, wherein assuming that a focal length of the first A lens group is f1A and a focal length of the first B lens group is f1B, Conditional Expression (5) is satisfied, $$0.1 < f1B/f1A < 0.9 \quad (5).$$

9. The imaging optical system according to claim 8, wherein Conditional Expression (5-1) is satisfied, $$0.2 < f1B/f1A < 0.7 \quad (5-1).$$

10. The imaging optical system according to claim 1, wherein assuming that a focal length of the imaging optical system is f and a back focal length at an air conversion distance of the imaging optical system in a case where the reduction side is set as a back side is Bf, Conditional Expression (6) is satisfied, $$4 < Bf/|f| \quad (6).$$

11. The imaging optical system according to claim 10, wherein Conditional Expression (6-1) is satisfied, $$7 < Bf/|f| < 15 \quad (6-1).$$

12. The imaging optical system according to claim 1, wherein a positive lens is adjacent to the negative lens, which is closest to the magnification side in the first B lens group, on the reduction side of the negative lens, and the positive lens and the negative lens, which is closest to the magnification side in the first B lens group, are cemented to each other.

13. The imaging optical system according to claim 1, wherein the first B lens group includes only four lenses, which consists of one negative lens and three positive lenses, as lenses having refractive powers.

14. The imaging optical system according to claim 1, wherein the second A lens group includes only three lenses, which consists of one negative lens and two positive lenses, as lenses having refractive powers.

15. The imaging optical system according to claim 1, wherein the second B lens group includes only four lenses, which consists of one negative lens and three positive lenses, as lenses having refractive powers.

16. The imaging optical system according to claim 1, wherein first, second, and third lenses from the magnification side in the first A lens group are all negative lenses.

17. A projection display device comprising:
   a light source;
   a light valve into which light emitted from the light source is incident; and
   the imaging optical system according to claim 1,
   wherein the imaging optical system projects an optical image using modulated light, which is modulated through the light valve, onto a screen.

18. An imaging apparatus comprising the imaging optical system according to claim 1.

* * * * *